(12) United States Patent
Hayes et al.

(10) Patent No.: US 11,390,134 B2
(45) Date of Patent: Jul. 19, 2022

(54) DUAL ZONE AUXILIARY CLIMATE CONTROL SYSTEM FOR A VEHICLE

(71) Applicant: FORD GLOBAL TECHNOLOGIES, LLC, Dearborn, MI (US)

(72) Inventors: Robert Louis Hayes, Dearborn, MI (US); Jennifer A. Herr-Rathke, Plymouth, MI (US); Steve Michael Kahrs, Canton, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 16/360,773

(22) Filed: Mar. 21, 2019

(65) Prior Publication Data
US 2020/0298650 A1 Sep. 24, 2020

(51) Int. Cl.
*B60H 1/00* (2006.01)

(52) U.S. Cl.
CPC .......... *B60H 1/00064* (2013.01); *B60H 2001/00092* (2013.01); *B60H 2001/00192* (2013.01)

(58) Field of Classification Search
CPC ........ B60H 1/00064; B60H 1/32; B60H 1/00; B60H 1/00735; B60H 1/00864; B60H 2001/00092; B60H 2001/00192; F28D 1/0417; F28D 1/0443
See application file for complete search history.

(56) References Cited

U.S. PATENT DOCUMENTS

| | | | |
|---|---|---|---|
| 3,908,751 A | 9/1975 | Sheppard, Jr. | |
| 4,361,170 A | 11/1982 | Peloza | |
| 4,482,009 A * | 11/1984 | Nishimura | B60H 1/00842 |
| | | | 165/203 |
| 5,142,881 A | 9/1992 | Nagayama | |
| 5,329,970 A | 7/1994 | Squirrell | |
| 5,394,860 A | 3/1995 | Borie | |
| 5,794,845 A * | 8/1998 | Ito | B60H 1/00328 |
| | | | 237/12.3 B |
| 5,902,181 A | 5/1999 | Bain | |

(Continued)

FOREIGN PATENT DOCUMENTS

| | | |
|---|---|---|
| EP | 1205321 A2 | 5/2002 |
| JP | 2006226649 A * | 8/2006 |
| JP | 2008293853 A | 12/2008 |

OTHER PUBLICATIONS

US Duct—Heavy Duty Butterfly, "The Complete Duct Source," at least as early as Jul. 28, 2018 (1 page).

(Continued)

*Primary Examiner* — Harry E Arant
(74) *Attorney, Agent, or Firm* — Vichit Chea; Price Heneveld LLP

(57) ABSTRACT

A dual zone auxiliary climate control system for a vehicle includes an evaporator, a heater core having a first zone and a second zone, a first zone mode door downstream from the first zone of the heater core, a second zone mode door downstream from the second zone of the heater core and a blower. The blower forces air through the evaporator and the heater core toward the first zone mode door and the second zone mode door. A method of providing a dual zone auxiliary climate control system is also disclosed.

14 Claims, 6 Drawing Sheets

(56) References Cited

U.S. PATENT DOCUMENTS

| | | | |
|---|---|---|---|
| 6,206,092 B1* | 3/2001 | Beck | B60H 1/00064 |
| | | | 165/203 |
| 6,415,851 B1 | 7/2002 | Hall et al. | |
| 6,491,578 B2* | 12/2002 | Yoshinori | B60H 1/00007 |
| | | | 165/203 |
| 6,959,754 B2 | 11/2005 | Lee et al. | |
| 7,434,612 B2* | 10/2008 | Alberternst | B60H 1/0005 |
| | | | 165/203 |
| 8,997,837 B2 | 4/2015 | Kakizaki | |
| 9,248,719 B2 | 2/2016 | Kang et al. | |
| 10,272,744 B2 | 4/2019 | Sawyer et al. | |
| 2007/0137833 A1 | 6/2007 | Kang et al. | |
| 2009/0007978 A1 | 1/2009 | Alston et al. | |
| 2009/0038774 A1 | 2/2009 | Ogiso et al. | |
| 2017/0066304 A1 | 3/2017 | Sawyer et al. | |
| 2019/0077286 A1* | 3/2019 | Filipkowski | B60H 1/00271 |

OTHER PUBLICATIONS

Plug-In Hybrid Electric Vehicles—DOE (Oct. 17, 2012), (Year: 2012).
Hybrid Electric Vehicles—DOE (Oct. 14, 2012), (Year: 2012).
All-Electric Vehicles—DOE (Oct. 18, 2012) (Year: 2012).
Non-Final Office Action dated Apr. 14, 2021, in U.S. Appl. No. 16/595,874, filed Oct. 8, 2019, entitled Modular Climate System Enabling Flexible Multi-Zone Temperature and Mode Control in Automotive HVAC Systems, 59 pages.

* cited by examiner

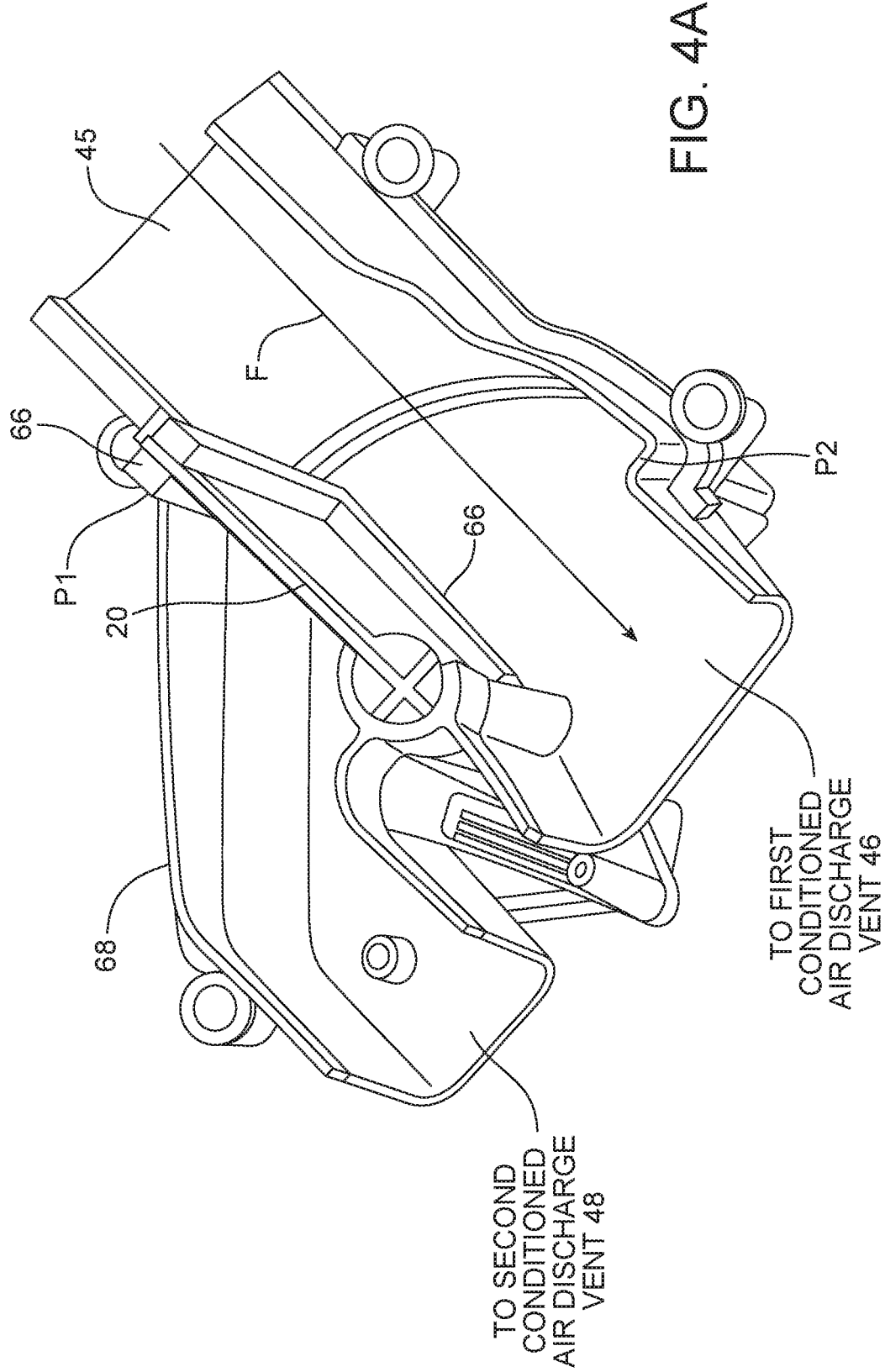

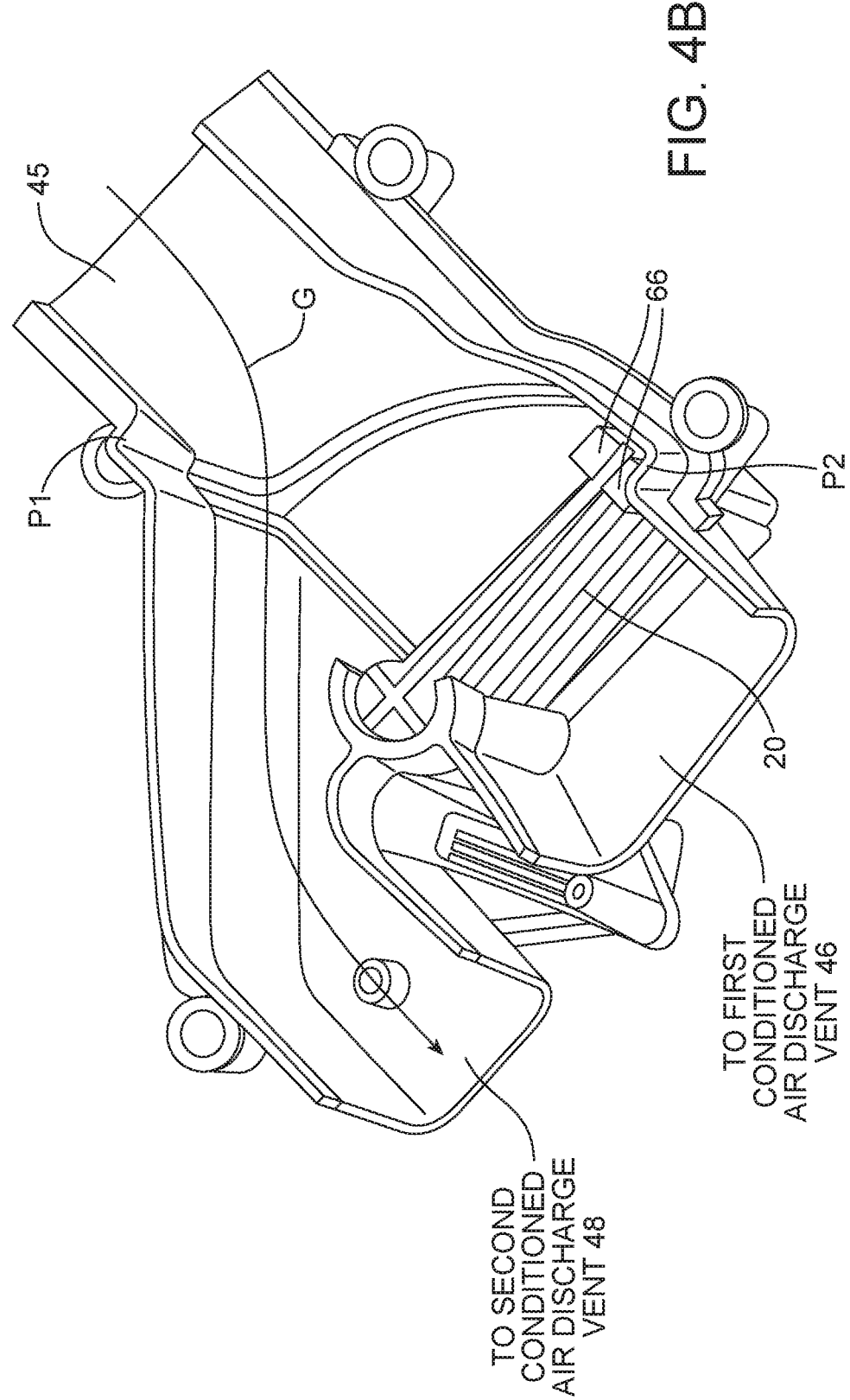

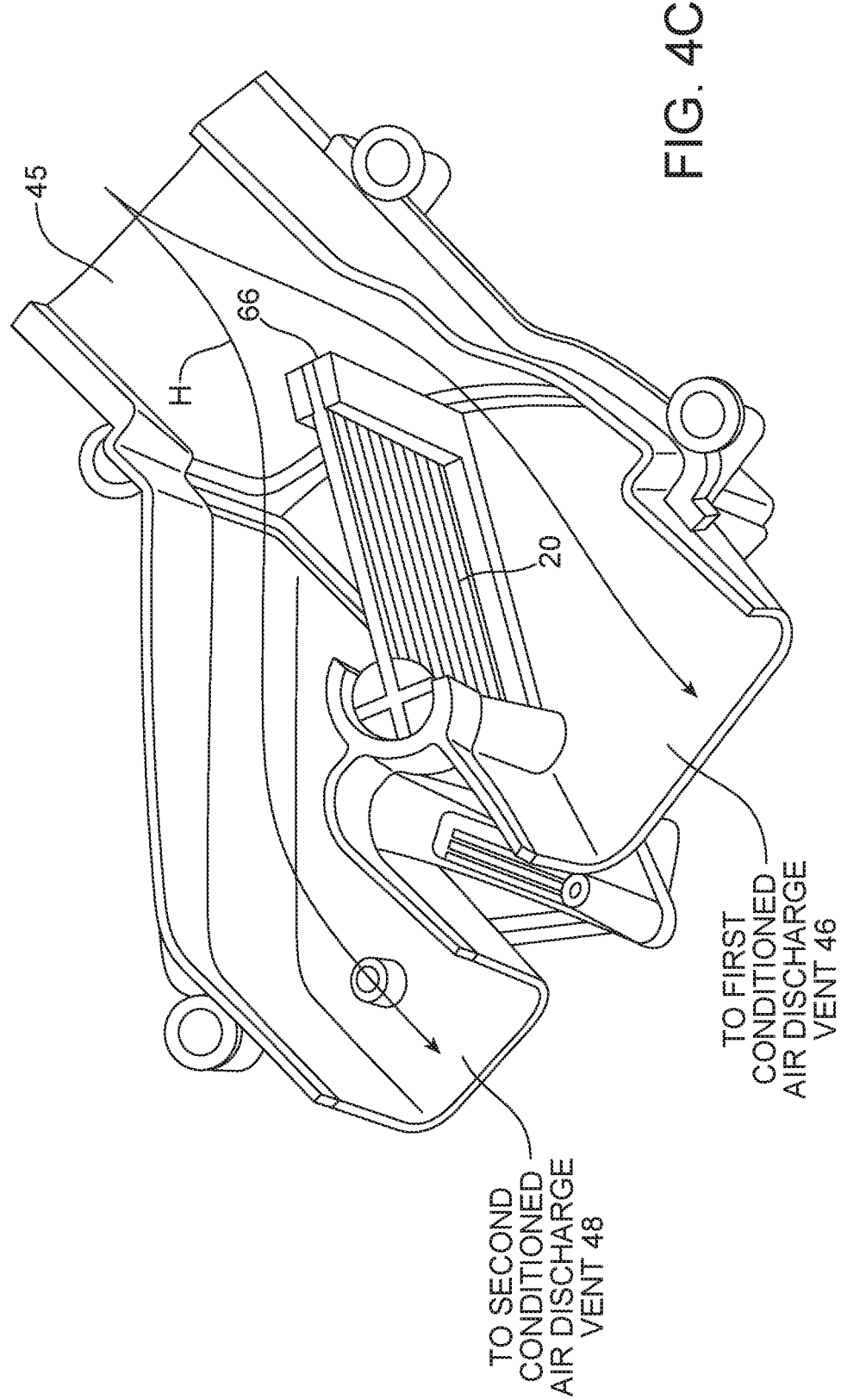

DUAL ZONE AUXILIARY CLIMATE CONTROL SYSTEM FOR A VEHICLE

TECHNICAL FIELD

This document relates generally to the vehicle equipment field and, more particularly, to a new and improved dual zone auxiliary climate control system incorporating an evaporator and blower of compact dimensions allowing greater design freedom and use of space for other purposes including additional seating space.

BACKGROUND

Traditional auxiliary evaporator and blower assemblies consist of at least one mode door driven by an electrical actuator, which allocates airflow between the roof and floor ducts of the vehicle, and at least one temperature door driven by an electrical actuator which controls the blending of hot and cold air to reach the desired temperature of the occupant. The conventional approach to creating a dual zone auxiliary evaporator and blower assembly would involve dividing the evaporator and blower assembly from left to right and adding an additional temperature door and electrical actuator. This assembly of components creates an auxiliary evaporator and blower assembly having a relatively wide footprint which limits design freedoms and reduces passenger space within the vehicle.

This document relates to a new and improved dual zone auxiliary climate control system having a relatively narrow footprint that effectively preserves additional space for passengers while also providing designers with greater design freedom.

SUMMARY

In accordance with the purposes and benefits described herein, a new and improved dual zone auxiliary climate control system is provided for a vehicle. That dual zone auxiliary climate control system comprises: (a) an evaporator, (b) a heater core having a first zone and a second zone, (c) a first zone mode door downstream from the first zone of the heater core, (d) a second zone mode door downstream from the second zone of the heater core and (e) a blower forcing air through the evaporator and heater core toward the first zone mode door and the second zone mode door.

The dual zone auxiliary climate control system may further include a first zone feed duct extending from the first zone of the heater core to the first zone mode door and a second zone feed duct extending from the second zone of the heater core to the second zone mode door. The dual zone auxiliary climate control system may further include a first conditioned air discharge vent and a second conditioned air discharge vent downstream from the first zone mode door.

The first zone mode door may be displaceable between a first position directing air to the first conditioned air discharge vent, a second position directing air to the second conditioned air discharge vent and a third position directing air to the first conditioned air discharge vent and the second conditioned air discharge vent.

The dual zone auxiliary climate control system may further include a third conditioned air discharge vent and a fourth conditioned air discharge vent. The third conditioned air discharge vent and the fourth conditioned air discharge vent may be provided downstream from the second zone mode door. The second zone mode door may be displaceable between a fourth position directing air to the third conditioned air discharge vent, a fifth position directing air to the fourth conditioned air discharge vent and a sixth position directing air to the third conditioned air discharge vent and the fourth conditioned air discharge vent.

The dual zone auxiliary climate control system may further include a first thermostat setting a commanded first temperature for a first climate control zone and a second thermostat setting a commanded second temperature for a second climate control zone. Still further, the dual zone auxiliary climate control system may include a coolant control valve allocating coolant from a heat source to the first zone and the second zone of the heater core to meet the commanded first temperature of the first climate control zone and the commanded second temperature of the second climate control zone.

The dual zone auxiliary climate control system may further include a partition between the first zone of the heater core and the second zone of the heater core. That partition may assume the form of a dead tube to reduce cross-talk between the first zone and the second zone. Further, the dual zone auxiliary climate control system may include a divider plate extending downstream from the dead tube.

Still further, the first conditioned air discharge vent may be located on a first side of the vehicle above the second conditioned air discharge vent. Similarly, the third conditioned air discharge vent may be located on a second side of the vehicle above the fourth conditioned air discharge vent.

In accordance with yet another aspect, a new and improved method of providing a dual zone auxiliary climate control system for a vehicle is disclosed. That method comprises the steps of: (a) forcing, by a blower, air through an evaporator and dual zone heater core, (b) directing air from a first zone of the dual zone heater core towards a first zone mode door and (c) directing air from a second zone of the dual zone heater core toward a second zone mode door.

The method may further include the step of providing a first thermostat for setting a commanded first temperature for a first climate control zone. Further, the method may include the step of providing a second thermostat for setting a commanded second temperature for a second climate control zone.

Still further, the method may include the step of allocating, by a flow control valve, coolant from a heat source to the first zone and the second zone of the heater core to meet the commanded first temperature of the first climate control zone and the commanded second temperature of the second climate control zone.

Still further, the method may include displacing the first zone mode door to allocate conditioned air from the first zone of the heater core between a first conditioned air discharge vent and a second conditioned air discharge vent. Further, the method may include the step of displacing the second zone mode door to allocate conditioned air from the second zone of the heater core between a third conditioned air discharge vent and a fourth conditioned air discharge vent.

The method may also include the step of providing (a) the first climate control zone and the first conditioned air discharge vent and the second conditioned air discharge vent on a first side of the vehicle and (b) the second climate control zone and third conditioned air discharge vent and the fourth conditioned air discharge vent on a second side of the vehicle. In addition, the method may include the step of providing the first conditioned air discharge vent above the second conditioned air discharge vent and the third conditioned air discharge vent above the fourth conditioned air discharge vent.

In the following description, there are shown and described several preferred embodiments of the dual zone auxiliary climate control system and the related method of providing a dual zone auxiliary climate control system for a vehicle. As it should be realized, the dual zone auxiliary climate control system and method are capable of other, different embodiments and their several details are capable of modification in various, obvious aspects all without departing from the dual zone auxiliary climate control system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the dual zone auxiliary climate control system and method and together with the description serve to explain certain principles thereof.

FIGS. 4A-4C are detailed schematic illustrations of one possible embodiment of a zone mode door utilized in the dual zone auxiliary climate control system.

FIG. 4A is a detailed schematic illustration of that mode door in a first operating position directing 100% of the airstream through a first conditioned air discharge vent.

FIG. 4B is a view similar to FIG. 4A but illustrating the mode door in a second operative position wherein 100% of the airstream is directed through a second conditioned air discharge vent.

FIG. 4C is a view similar to FIGS. 4A and 4B but illustrating the mode door in a third operative position wherein a portion of the airstream is delivered through both of the first and second conditioned air discharge vents.

Reference will now be made in detail to the present preferred embodiments of the dual zone auxiliary climate control system as well as to the related method of providing a dual zone auxiliary climate control system for a vehicle, examples of which are illustrated in the accompanying drawing figures.

DETAILED DESCRIPTION

Figure 1:
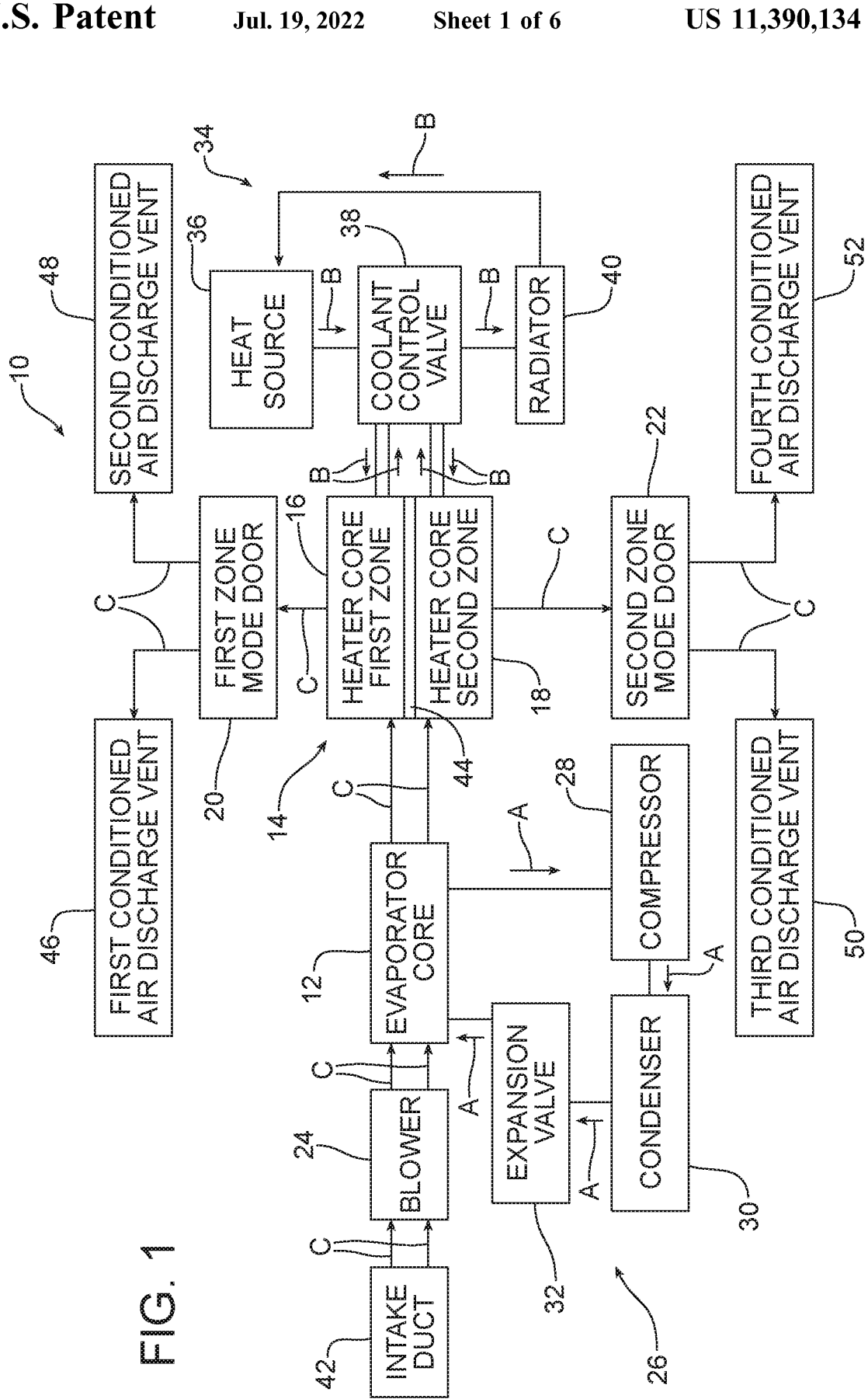
FIG. 1 is an auxiliary block diagram illustrating the dual zone auxiliary climate control system and its connection to a refrigerant circuit and coolant circuit of a vehicle in which the dual zone auxiliary climate control system is incorporated.
Figure 2:
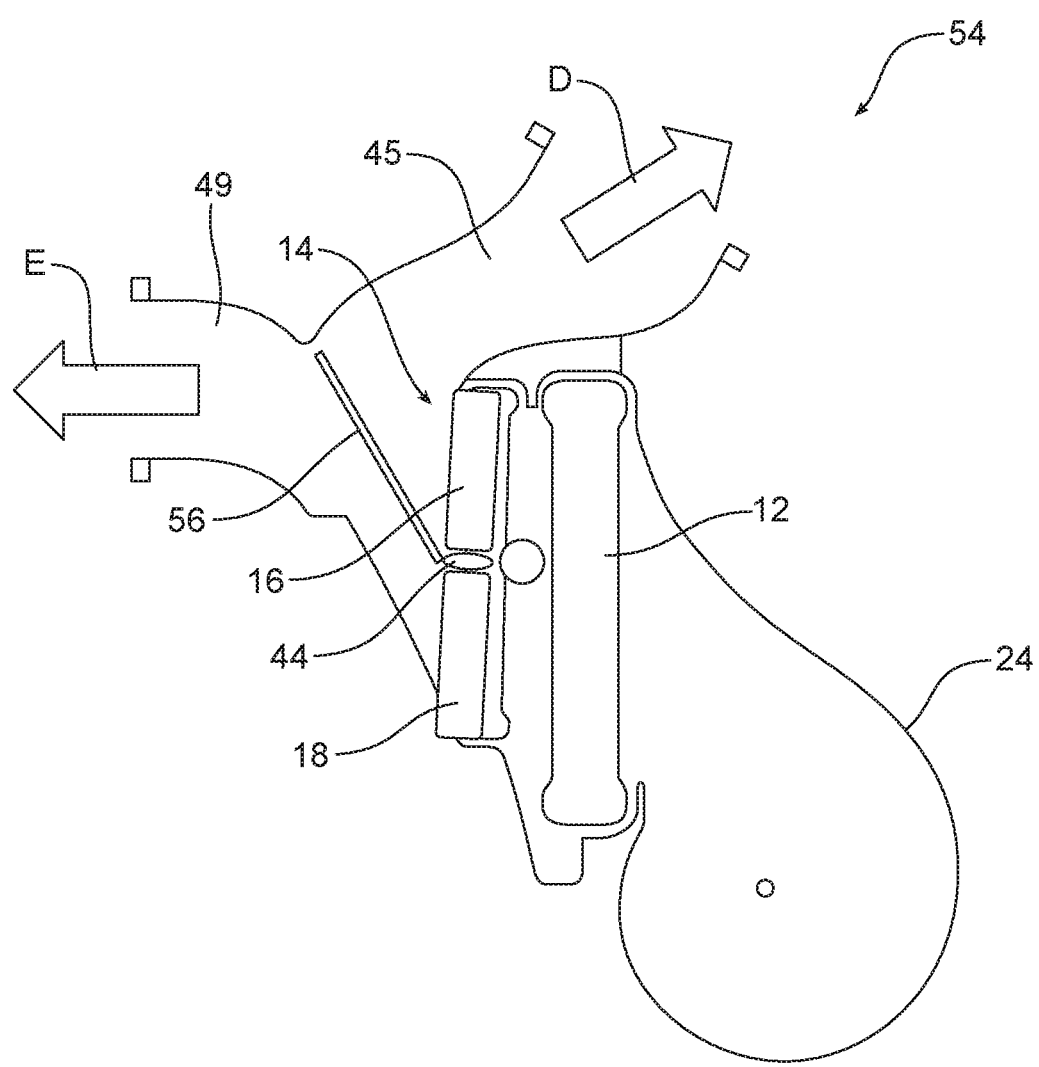
FIG. 2 is a schematic illustration of the evaporator, heater core and blower assembly of the dual zone auxiliary climate control system.

Reference is now made to FIGS. 1 and 2 generally illustrating the new and improved dual zone auxiliary climate control system 10 adapted for a vehicle such as a motor vehicle or an autonomous vehicle. The dual zone auxiliary climate control system 10 is adapted for use in a vehicle heating, ventilating and air conditioning system (HVAC system) also incorporating a main or primary climate control system. Typically, the dual zone auxiliary climate control system 10 is adapted for maintaining climate control at the rear of the vehicle behind the front row seating.

The dual zone auxiliary climate control system 10 includes an evaporator 12, a heater core 14 having a first zone 16 and a second zone 18, a first zone mode door 20, downstream from the first zone of the heater core, and a second zone mode door 22, downstream from the second zone of the heater core, and a blower 24. The blower 24 is adapted for forcing air through the evaporator 12 and the heater core 14 toward the first zone mode door 20 and the second zone mode door 22 in a manner described in greater detail below.

More particularly, the evaporator 12 may be of a type known in the art allowing heat exchange between the air being moved by the blower 24 and a refrigerant being circulated through a refrigerant circuit generally designated by reference numeral 26. The refrigerant circuit 26 includes a compressor 28, a condenser 30 and an expansion valve 32. A refrigerant fluid, of a type known in the art, is circulated between the compressor 28, the condenser 30, the expansion valve 32 and the evaporator 12 in a manner also known in the art. In FIG. 1, action arrows A illustrate the flow of refrigerant through the refrigerant circuit 26.

The heater core 14 is connected to a coolant circuit generally designated by reference numeral 34. Coolant circuit 34 includes a heat source 36 such as the engine or battery electric vehicle power train and battery, a coolant control valve 38 and a radiator 40. As illustrated by action arrows B, hot coolant from the heat source 36 is circulated through the coolant control valve 38 before being cooled through heat exchange with ambient air at the radiator 40 and then being returned back to the heat source. Coolant control valve 38 functions to allocate coolant from the heat source 36 to the first zone 16 and the second zone 18 of the heater core 14 to meet the temperature demands of the dual zone auxiliary climate control system 10 in a manner described in greater detail below.

Action arrows C in FIG. 1 illustrate the flow of conditioned air through the dual zone auxiliary climate control system 10. More particularly, fresh air from outside the vehicle or recycled air from a passenger compartment within the vehicle is drawn through the intake 42 by the blower 24 and then forced through the evaporator 12 in heat exchange relationship with the refrigerant from the refrigerant circuit 26. As a result the airstream is cooled and dehumidified in a manner known to those skilled in the art. That airstream is then forced by the blower 24 through the heater core 14. As illustrated in FIGS. 1 and 2, the heater core 14 includes a partition 44 that divides the heater core into the first zone 16 and the second zone 18. That partition 44 may take the form of a dead tube to reduce cross-talk between the first zone 16 and the second zone 18. A first portion of the airstream is forced by the blower 24 through the first zone 16 of the heater core 14 where the airstream is in heat exchange relationship with hot coolant provided from the coolant circuit 34. The now fully conditioned air from the first zone 16 of the heater core 14 is force by the blower 24 through the first zone feed duct 45 to the first zone mode door 20. The first zone mode door 20 functions to direct that air to the first conditioned air discharge vent 46, the second conditioned air discharge vent 48 or both the first and second conditioned air discharge vents. Conditioned air expelled from the first conditioned air discharge vent 46 and the second conditioned air discharge vent 48 is directed into a first climate control zone $Z_1$ of the vehicle V. See also FIG. 3.

A second portion of the airstream is forced by the blower 24 through the second zone 18 of the heater core 14. That second portion of the airstream is in heat exchange relationship with hot coolant provided from the coolant circuit 34 to the second zone 18 of the heater core 14. The now fully conditioned second portion of the airstream is then forced by the blower 24 through the second zone feed duct 49 to the second zone mode door 22. The second zone mode door 22 directs that second fully conditioned portion of the airstream to the third conditioned air discharge vent 50, the fourth conditioned air discharge vent 52 or both the third and fourth conditioned air discharge vents. Conditioned air expelled from the third and fourth conditioned air discharge vents 50, 52 is directed into a second climate control zone $Z_2$ of the vehicle V. See also FIG. 3.

FIG. 2 schematically illustrates the evaporator and blower assembly 54 of the dual zone auxiliary climate control system 10. That evaporator and blower assembly 54 includes the blower 24, the evaporator 12 and the heater core 14 downstream from the evaporator 12. The evaporator and blower assembly 54 does not include any temperature and mode control doors. This allows for smaller packaging in a smaller space.

In the illustrated embodiment the heater core 14 includes the first zone 16 and a second zone 18 divided by the partition 44. As illustrated, the partition 44 comprises a dead tube that reduces cross-talk (heat transfer) between the first zone 16 and the second zone 18. That dead tube extends in a horizontal plane substantially parallel to the Y axis of the vehicle as designated by the SAE vehicle access system. (See also FIG. 3.) As illustrated, a divider plate 56 extends downstream from the dead tube or partition 44 to ensure that the first portion of the conditioned air flowing from the first zone 16 of the heater core 14 is directed through the first zone feed duct 45 to the first zone mode door 20 (note action arrow D) and the second portion of the conditioned air passing through the second zone 18 of the heater core 14 passes through the second zone feed duct 49 to the second zone mode door 22 (note action arrow E).

Figure 3:
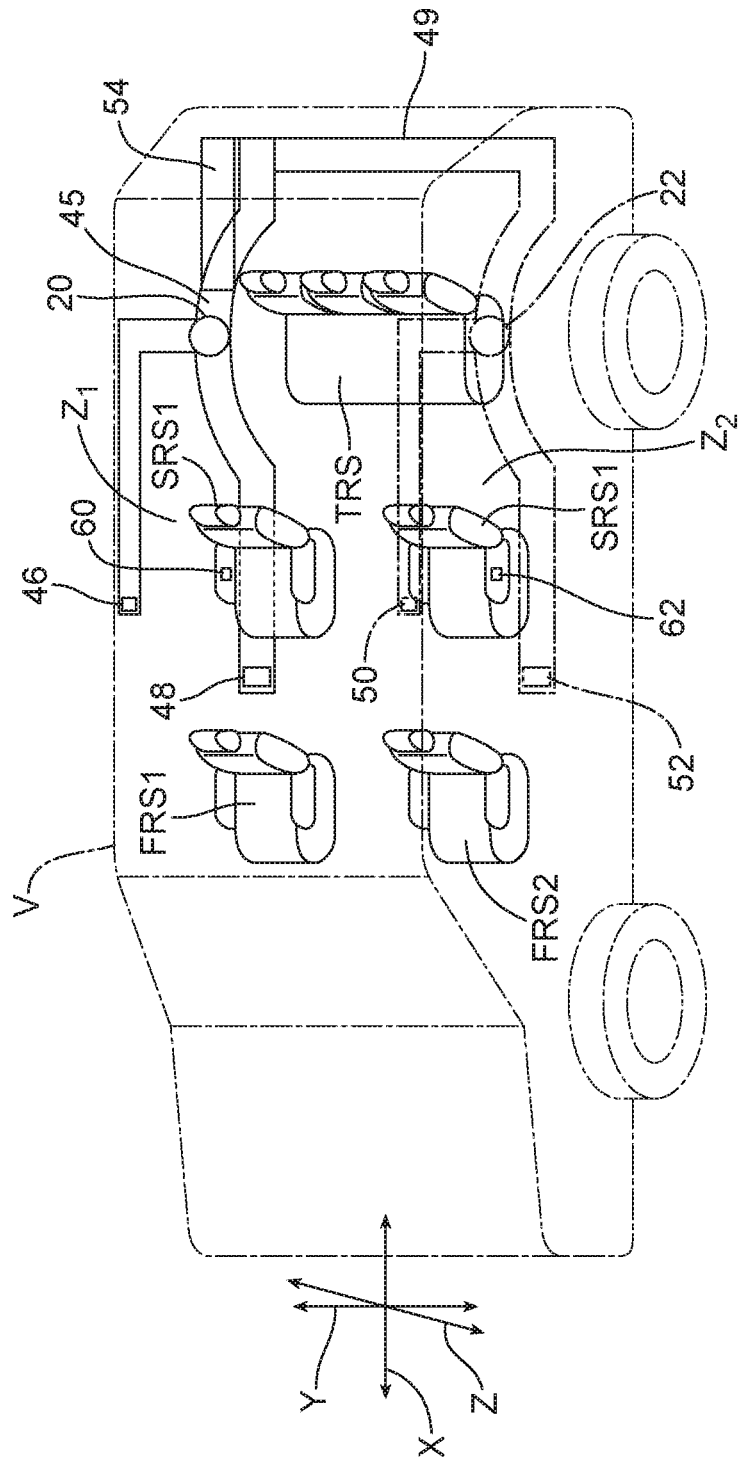
FIG. 3 is a schematic illustration of the dual zone auxiliary climate control system within a vehicle.

FIG. 3 illustrates one possible application of the dual zone auxiliary climate control system 10 in a vehicle V. In the illustrated embodiment, the main climate control system (not shown) functions to control the climate at the front of the vehicle for those seated in the front row seats FRS1 and FRS2. The dual zone auxiliary climate control system 10 functions to provide climate control to those seated in the second row seats SRS1 and SRS2 and the third row bench seat TRS.

More particularly, in the illustrated embodiment, the evaporator and blower assembly 54 is provided in the right rear corner of the vehicle V. The first zone feed duct 45 extends from the first zone 16 of the heater core 14 in the evaporator and blower assembly 54 to the first zone mode door 20. The first conditioned air discharge vent 46 is located on the first or right side of the vehicle above the second conditioned air discharge vent 48 downstream from the first zone mode door 20.

The second zone feed duct 49 extends from the second zone 18 of the heater core 14 in the evaporator and blower assembly 54 across the vehicle V to the second zone mode door 22 located on the left side of the vehicle opposite the first zone mode door 20. The third conditioned air discharge vent 50 is located on the second or left side of the vehicle V above the fourth conditioned air discharge vent 52.

In one possible embodiment, the second and fourth conditioned air discharge vents 48, 52 may be provided on or adjacent the floor of the vehicle while the first and third conditioned air discharge vents 46, 50 may be provided in or near the roof of the motor vehicle. Thus, the first and second conditioned air discharge vents 46, 48 are positioned to provide the first climate control zone $Z_1$ along the right side of the vehicle rearward of the front row seat FRS1 while the third and fourth conditioned air discharge vents 50, 52 are positioned to provide the second climate control zone $Z_2$ on the left side of the vehicle rearward of the front row seat FRS2.

A first thermostat 60 allows an occupant to set a commanded first temperature for the first climate control zone $Z_1$ while a second thermostat 62 allows an occupant to set a commanded second temperature for the second climate control zone $Z_2$. The thermostats 62, 62 may be located at substantially any convenient location. They may also be provided as a part of the central human machine interface (HMI) of the motor vehicle such as along the center stack or center console between the front row seats FRS1 and FRS2: a structure not shown in FIG. 3.

Reference is now made to FIGS. 4A-4C illustrating a first possible embodiment of the first zone mode door 20. The displaceable first zone mode door 20 may be selectively displaced between a number of different operating positions. FIG. 4A illustrates the first zone mode door 20 in a first operating position, wherein 100% of the airstream (note action arrow F) is directed from the first zone feed duct 45 to the first conditioned air discharge vent 46 and the second conditioned air discharge vent 48 is sealed off by the displaceable mode door 20 (note door seal 66 seated against the housing section 68 at point P1).

FIG. 4B illustrates the displaceable first zone mode door 20 in a second operating position wherein 100% of the airstream (note action arrow G) is directed from the first zone feed duct 45 to the second conditioned air discharge vent 48 and the first conditioned air discharge vent 46 is sealed off by the mode door (note door seal 66 engaging housing at point P2).

FIG. 4C illustrates the displaceable first zone mode door 20 in a third operating or intermediate position wherein a first portion of the airstream is directed from the first zone feed duct 45 to the first conditioned air discharge vent 46 and a second portion of the airstream is directed to the second conditioned air discharge vent 48 (see split action arrow H).

An actuator (not shown) of a type known in the art displaces the mode door 20 between these operating positions. In the embodiment illustrated in FIGS. 4A-4C, adjustable vanes of a type known in the art may be provided at each of the first and second conditioned air discharge vents 46, 48 to shut off all airflow if desired. While not illustrated, it should be appreciated that the second zone mode door 22 could also incorporate the structure of the first zone mode door 20 as described above and illustrated in FIGS. 4A-4C.

It should also be appreciated that the mode door could be modified to provide for the shutting off of the air flow instead of depending upon adjustable vanes of the type noted above.

Consistent with the above description, a new and improved method of providing a dual zone auxiliary climate control system 10 for a vehicle V is disclosed. That method includes the steps of (a) forcing, by the blower 24, air through the evaporator 12 and a dual zone heater core 14, (b) directing air from a first zone 16 of the dual zone heater core toward a first zone mode door 20 and (c) directing air from a second zone 18 of the dual zone heater core toward a second zone mode door 22.

Still further, the method includes the step of providing a first thermostat 60 for setting a commanded first temperature for a first climate control zone $Z_1$ and providing a second thermostat 62 for setting a commanded second temperature for the second climate control zone $Z_2$. The method also includes the step of allocating, by the coolant control valve 38, coolant from a heat source 36, such as the engine, to the first zone 16 and the second zone 18 of the heater core 14 to meet the commanded first temperature of the first climate control zone $Z_1$ and the commanded second temperature of the second climate control zone $Z_2$. Thus, it should be appreciated that temperature control for each of the zones $Z_1$ and $Z_2$ is provided through the thermostats 60, 62 and operation of the coolant control valve 38. That coolant control valve 38 could also include a bypass path position to allow hot coolant to bypass the heater core 14 to prevent "water hammer" noise/vibration that could be created by abruptly stopping flow through the system altogether.

Still further, the method includes displacing the first zone mode door 20 to allocate conditioned air from the first zone 16 of the heater core 14 between a first conditioned air discharge vent 46 and a second conditioned air discharge vent 48. In addition, the method includes the step of displacing the second zone mode door 22 to allocate conditioned air from the second zone 18 of the heater core 14 between a third conditioned air discharge vent 50 and a fourth conditioned air discharge vent 52.

The method also includes the step of providing the first climate control zone $Z_1$ and the first and second conditioned air discharge vents 46, 48 on a first side of the vehicle V and the second climate control zone $Z_2$ and the third and fourth conditioned air discharge vents 50, 52 on a second side of the vehicle. Still further, the method may include providing the first conditioned air discharge vent 46 above the second conditioned air discharge vent 48 and the third conditioned air discharge vent 50 above the fourth conditioned air discharge vent 52.

The foregoing has been presented for purposes of illustration and description. It is not intended to be exhaustive or to limit the embodiments to the precise form disclosed. Obvious modifications and variations are possible in light of the above teachings. For example, in a battery electric vehicle or an autonomous vehicle, the heat source for the coolant circuit 34 may comprise the powertrain, the battery pack, the vehicle electronics and/or a dedicated coolant heater. For example, the partition 44 need not take the form of a dead tube as illustrated and discussed above. All such modifications and variations are within the scope of the appended claims when interpreted in accordance with the breadth to which they are fairly, legally and equitably entitled.

What is claimed:

1. A motor vehicle including a main climate control system and a dual zone auxiliary climate control system, the motor vehicle comprising:
    a passenger compartment located between right and left sides of the motor vehicle, the passenger compartment having a front portion and a rear portion, a first climate control zone on a right side of the passenger compartment, and a second climate control zone on a left side of the passenger compartment;
    front row seats disposed in the front portion of the passenger compartment;
    second row seats disposed in the passenger compartment behind the front row seats;
    third row seats disposed in the rear portion of the passenger compartment behind the second row seats;
    a main climate control system configured to control the climate of the front portion of the passenger compartment, including the front row seats;
    the dual zone auxiliary climate control system comprising:
    a heat source configured to provide coolant;
    an evaporator and blower assembly located rearward of the third row seats, the evaporator and blower assembly including an evaporator, a heater core fluidly connected to the heat source, and a blower;
    a first thermostat setting a commanded first temperature for the first climate control zone and a second thermostat setting a commanded second temperature for the second climate control zone;
    a coolant control valve allocating coolant from the heat source to the heater core to control an amount of heat provided by the heater core;
    a first zone mode door downstream from the heater core remote from and forward of the evaporator and blower assembly;
    a second zone mode door downstream from the heater core remote from and forward of the evaporator and blower assembly;
    wherein the first zone mode door is positioned forward of the heater core directly adjacent the right side of the motor vehicle forward of the heater core, and the second zone mode door is positioned forward of the heater core directly adjacent the left side of the motor vehicle forward of the heater core, and wherein the third row seats are disposed between the first zone mode door and the second zone mode door;
    wherein the blower is configured to simultaneously force air through the evaporator and the heater core through a first zone feed duct toward the first zone mode door and through a second zone feed duct toward the second zone mode door;
    wherein the first zone feed duct extends forward from the heater core to the first zone mode door and the second zone feed duct extends forward from the heater core to the second zone mode door;
    a first conditioned air discharge vent in a roof of the motor vehicle and a second conditioned air discharge vent on or adjacent a floor of the motor vehicle wherein the first conditioned air discharge vent and the second conditioned air discharge vent are both downstream from the first zone mode door;
    a first vent duct extending upwardly from the first zone mode door to the first conditioned air discharge vent in the roof of the motor vehicle; and
    a second vent duct extending forwardly from the first zone mode door to the second conditioned air discharge vent on or adjacent a floor of the motor vehicle;
    wherein the first zone mode door is displaceable between a first position directing air through the first vent duct to the first conditioned air discharge vent in the roof of the motor vehicle, a second position directing air through the second vent duct to the second conditioned air discharge vent on or adjacent a floor of the motor vehicle, and a third position simultaneously directing air through both the first and second vent ducts to both the first conditioned air discharge vent and the second conditioned air discharge vent on or adjacent a floor of the motor vehicle;
    a third conditioned air discharge vent in a roof of the motor vehicle and a fourth conditioned air discharge vent on or adjacent a floor of the motor vehicle, wherein the third conditioned air discharge vent and the fourth conditioned air discharge vent are both downstream from the second zone mode door;
    a third vent duct extending upwardly from the second mode door to the third conditioned air discharge vent in the roof of the motor vehicle; and
    a fourth vent duct extending forwardly from the second zone mode door to the fourth conditioned air discharge vent on or adjacent a floor of the motor vehicle;

wherein the second zone mode door is displaceable between a fourth position directing air through the third vent duct to the third conditioned air discharge vent in the roof of the motor vehicle, and a fifth position directing air through the fourth vent duct to the fourth conditioned air discharge vent on or adjacent a floor of the motor vehicle and a sixth position simultaneously directing air through both the third and fourth vent ducts to both the third conditioned air discharge vent in the roof of the motor vehicle and the fourth conditioned air discharge vent on or adjacent a floor of the motor vehicle;

and wherein the first zone feed duct includes a portion that extends in a forward direction along the right side of the motor vehicle from the heater core to the first zone mode door, the second zone feed duct having a portion that extends in a forward direction along the left side of the motor vehicle to the second mode door.

2. The motor vehicle of claim 1, wherein:
the heater core includes first and second zones; and including:
a partition between the first zone of the heater core and the second zone of the heater core.

3. The motor vehicle of claim 2, wherein:
the partition is a dead tube to reduce heat transfer between the first zone and the second zone.

4. The motor vehicle of claim 3, further including:
a divider plate extending downstream from the dead tube.

5. The motor vehicle of claim 4, wherein:
the first conditioned air discharge vent is located on a first side of the motor vehicle above the second conditioned air discharge vent;
the third conditioned air discharge vent is located on a second side of the vehicle above the fourth conditioned air discharge vent.

6. The motor vehicle of claim 1, wherein:
the front row seats include right and left seats;
the second row seats include right and left seats;
the first and second conditioned air discharge vents are positioned to the right of the right seat of the second row seats and rearward of the right seat of the front row seats; and
the third and fourth conditioned air discharge vents are positioned to the left of the left seat of the second row seats and rearward of the left seat of the front row seats.

7. The motor vehicle of claim 6, wherein:
the evaporator, the heater core, and the blower are located at a first rear corner of the motor vehicle.

8. The motor vehicle of claim 7, wherein:
the first portion of the second feed zone duct extends across the motor vehicle to a second rear corner of the vehicle opposite the first corner;
the first and second zone mode doors are located forwardly of the evaporator, the heater core, and the blower and rearwardly of the second row seats.

9. The motor vehicle of claim 1, wherein:
the dual zone auxiliary climate control system does not include any movable doors upstream of the heater core.

10. The motor vehicle of claim 1, wherein:
the first zone feed duct and the second zone feed duct extend in substantially opposite directions.

11. The motor vehicle of claim 1, wherein:
the dual zone auxiliary climate control system does not include any movable doors except the first and second zone mode doors.

12. The motor vehicle of claim 1, wherein:
the heater core has a first zone and a second zone; and the coolant control valve allocates coolant from the heat source to the first zone and the second zone of the heater core to meet the commanded first temperature of the first climate control zone and the command second temperature of the second climate control zone.

13. The motor vehicle of claim 12, wherein:
the dual zone auxiliary climate control system does not include any temperature control doors.

14. A motor vehicle including a main climate control system and a dual zone auxiliary climate control system, the motor vehicle comprising:
a passenger compartment located between right and left sides of the motor vehicle, the passenger compartment having a front portion and a rear portion, a first climate control zone on a right side of the passenger compartment, a second climate control zone on a left side of the passenger compartment;
a front row of seats disposed in the front portion of the passenger compartment;
a second row of seats disposed in the passenger compartment behind the front row seats;
a third row of seats disposed in the rear portion of the passenger compartment behind the second row of seats;
wherein the main climate control system is configured to control the climate of the front portion of the passenger compartment, including the front row of seats;
the dual zone auxiliary climate control system comprising:
a heat source configured to provide coolant;
an evaporator and blower assembly located rearward of the third row of seats, the evaporator and blower assembly including an evaporator, a heater core fluidly connected to the heat source, and a blower;
a first thermostat setting a commanded first temperature for the first climate control zone and a second thermostat setting a commanded second temperature for the second climate control zone;
a coolant control valve allocating coolant from the heat source to the heater core to control an amount of heat provided by the heater core;
a first zone mode door downstream from the first zone of the heater core;
a second zone mode door downstream from the second zone of the heater core, wherein the first zone mode door is positioned directly adjacent the right side of the motor vehicle forward of the heater core, and the second zone mode door is positioned directly adjacent the left side of the motor vehicle forward of the heater core;
wherein the first and second zone mode doors are laterally spaced apart and the rear portion of the passenger compartment is disposed between the first and second mode doors;
wherein the blower is configured to force air through the evaporator and the heater core toward the first zone mode door and the second zone mode door;
a first zone feed duct extending from the heater core to the first zone mode door and a second zone feed duct extending from the heater core to the second zone mode door;
first and second conditioned air discharge vents downstream from the first zone mode door;
wherein the first zone mode door is displaceable between a first position directing air to only the first conditioned air discharge vent, a second position directing air to only the second conditioned air discharge vent, and a third position simultaneously directing air to both the first conditioned air discharge vent and the second conditioned air discharge vent;

third and fourth conditioned air discharge vents downstream from the second zone mode door;

wherein the second zone mode door is displaceable between a fourth position directing air to only the third conditioned air discharge vent, a fifth position directing air to only the fourth conditioned air discharge vent, and a sixth position simultaneously directing air to both the third conditioned air discharge vent and the fourth conditioned air discharge vent;

and wherein the first zone feed duct includes a portion that extends in a forward direction along a right side of the motor vehicle from the heater core to the first zone mode door, and the second zone feed duct includes a portion that extends in a forward direction along a right side of the motor vehicle to the second zone mode door.

* * * * *